(12) United States Patent
Lee et al.

(10) Patent No.: US 6,839,707 B2
(45) Date of Patent: Jan. 4, 2005

(54) WEB-BASED SYSTEM AND METHOD FOR MANAGING LEGAL INFORMATION

(75) Inventors: Mary Lee, Atlanta, GA (US); Suzanne Hawkins, Darien, CT (US)

(73) Assignee: General Electric Company, Schenectady, NY (US)

(*) Notice: Subject to any disclaimer, the term of this patent is extended or adjusted under 35 U.S.C. 154(b) by 646 days.

(21) Appl. No.: 09/761,947

(22) Filed: Jan. 17, 2001

(65) Prior Publication Data

US 2003/0074354 A1 Apr. 17, 2003

(51) Int. Cl.[7] .............................................. G06F 17/30
(52) U.S. Cl. .............................................. 707/8; 707/7
(58) Field of Search .............................. 707/8, 1, 2, 3, 707/6, 7, 9, 10, 102, 104; 715/531

(56) References Cited

U.S. PATENT DOCUMENTS

| | | | |
|---|---|---|---|
| 5,489,213 A | | 2/1996 | Makipaa |
| 5,602,536 A | | 2/1997 | Henderson et al. |
| 5,692,206 A | * | 11/1997 | Shirley et al. ............... 715/531 |
| 5,875,431 A | | 2/1999 | Heckman et al. |
| 5,920,873 A | | 7/1999 | Van Huben et al. |
| 5,956,687 A | | 9/1999 | Wamsley et al. |
| 6,088,693 A | | 7/2000 | Van Huben et al. |
| 6,366,925 B1 | * | 4/2002 | Meltzer et al. ................ 705/6 |
| 6,549,894 B1 | * | 4/2003 | Simpson et al. ............... 707/1 |

* cited by examiner

Primary Examiner—Sanjiv Shah
(74) Attorney, Agent, or Firm—Armstrong Teasdale LLP

(57) ABSTRACT

The disclosed invention, a Legal Management System (LMS), is a fully integrated web-based interactive database to automate the management process for storing, disseminating and searching information in real time. The invention is a method using a web-based system including a server system coupled to a centralized interactive database and at least one client system. The method involves receiving information from a client system, storing the information into a centralized database, updating the centralized database periodically to maintain the information, and providing the up-to-date information in response to an inquiry.

29 Claims, 18 Drawing Sheets

FIG. 17

| Name | Type | Status | Order | Path | Display | Columns |
|---|---|---|---|---|---|---|
| Compliance-Integrity | folder | active | 8 | Compliance-Integrity | null | 3 |
| Human Resources | folder | active | 3 | Human Resources | null | 3 |
| Legal Productivity | folder | active | 5 | Legal Productivity | null | 3 |
| Our Organization | folder | active | 4 | Our Organization | null | 3 |
| Practice Group | folder | active | 1 | Practice Group | null | 3 |
| Quality | folder | active | 7 | Quality | null | 3 |
| Regional Components | folder | active | 2 | Regional Components | null | 3 |
| Technology | folder | active | 6 | Technology | null | 3 |
| Website Administration | folder | active | 1000 | null | | |

WEB-BASED SYSTEM AND METHOD FOR MANAGING LEGAL INFORMATION

BACKGROUND OF THE INVENTION

This invention relates generally to an integrated knowledge management system and more specifically, to a web-based method and system for storing, disseminating, and searching information in real time.

Legal communities of successful business entities may include several hundred attorneys from various practice groups representing many business divisions in different countries. The legal community generally has a need to store, disseminate, and search information in a real-time basis. However, the known document management methods and systems utilized by the legal community have several disadvantages. For example, current document management methods and systems are largely paper-based and create filing and storing problems. In addition, these methods are time consuming and finding a specific document is sometimes a serious challenge. The problem is more acute in organizations having multiple divisions, and especially organizations with globally distributed divisions where managing business requires immediate attention, review, and approval at various levels across the globe.

Therefore, it would be desirable to have network-based systems and methods that provide an efficient way to obtain data and manage information.

BRIEF SUMMARY OF THE INVENTION

A Legal management system (LMS), is a fully integrated on-line web-based company-wide communication tool. The LMS is a centralized and integrated legal department management tool configured to drive accountability and performance and to improve operational efficiency. The LMS enhances the lines of communication across all attorneys within a legal counsel department and across the globe by enabling the sharing of pertinent legal information and knowledge among teams and by facilitating approval and reviews by decision-makers through the use of on-line comment and feedback capabilities. The LMS streamlines processes, enhances access of legal information, and simplifies business processes within the legal department. The LMS functionality is important, particularly in the fast changing E-business environment.

The LMS is a web portal, which contains user profiles and is comprised of three additional applications: the intranet, Outside Counsel Management System (OCMS), and Restrictive Covenant Database (RCDB). The intranet is a searchable web-based system for collecting, tracking and disseminating information about a business entity's legal community on a real time basis. All three applications are written in Microsoft Active Server Pages technology. The intranet and OCMS are written with VBScript as the server side language and JavaScript as the client side language. Database interaction for the intranet is handled with the ADO component via an ODBC connection to a SQL Server 6.5 database.

The system captures business/legal information pertaining to the business entity and provides such information in a variety of reporting formats on-line to the user. In one exemplary embodiment, the system utilizes a Structured Query Language (SQL) server database with a client user interface front-end for administration and a web interface for standard user input and reports. The LMS stores business/legal department related data in the database in several separate sections such as a Practice Group Information Section, a Preferred Provider Information Section, a Regional Information Section, a Commercial Transaction Information Section, an Organizational Information Section, an Administrative/Security Information Section, and a Resources Information Section.

In one aspect, the present invention is a method that includes the steps of receiving and storing legal/business information in a central database. The information is organized within the centralized database and reported to a user. In one embodiment, and to practice the method for managing legal/business information, accountability and performance on-line, a web-based system including a client system and a server system is utilized. The server system is connected to a centralized interactive database for receiving legal/business related information from a client system, storing the legal/business information into a centralized database, updating the centralized database periodically to maintain the legal/business information, and finally providing up-to-date legal/business information to any user, upon request, within the organization having a valid authorization to access this confidential information.

In another aspect, the present invention is a system for document management. In an exemplary embodiment, the system includes at least one computer coupled to a server configured to receive and store legal/business related information in a centralized database. The server is further configured to organize the information within the central database and to report the information to a user. The system is further configured to be a server for the computer. The system also includes a network connecting the server to the computer and an interface that allows a requester to input the information and to receive the information output.

In yet another embodiment, the invention is an apparatus for managing, storing, disseminating and sharing information on-line in real time using a network based Legal Management System which includes a server system, a client system and a centralized interactive database connected to the server system and the client system by a communication link. The apparatus includes a Security Module providing a user access into various applications including legal productivity and collaboration tools such as the Outside Counsel Management System, Lotus Quick-Place and Sametime. The apparatus further includes an Administrative Management Module to create user identifications and passwords via web forms making direct database connections to the SQL server backend, a robust Search Engine Module capable of searching numerous documents stored in various libraries in the centralized database, and a Content Management Module allowing the user without HTML knowledge to attach, delete, and modify documents in formats such as Word, Word Perfect, Power point, Excel, and Portable Document Format.

BRIEF DESCRIPTION OF THE DRAWINGS

FIG. 17 is an exemplary embodiment of a Webmaster Module user interface displayed by the LMS.

DETAILED DESCRIPTION OF THE INVENTION

Exemplary embodiments of systems and processes that facilitate integrated network-based electronic reporting and workflow process management related to the Legal Management System are described below in detail. The systems and processes facilitate, for example, electronic submission of information using a client system automated extraction of information, and web-based assessment reporting and management of acquisitions for internal system users.

The systems and processes are not limited to the specific embodiments described herein. Components of each system and each process can be practiced independent and separate from other components and processes described herein. Each component and process also can be used in combination with other components and processes.

Figure 1:
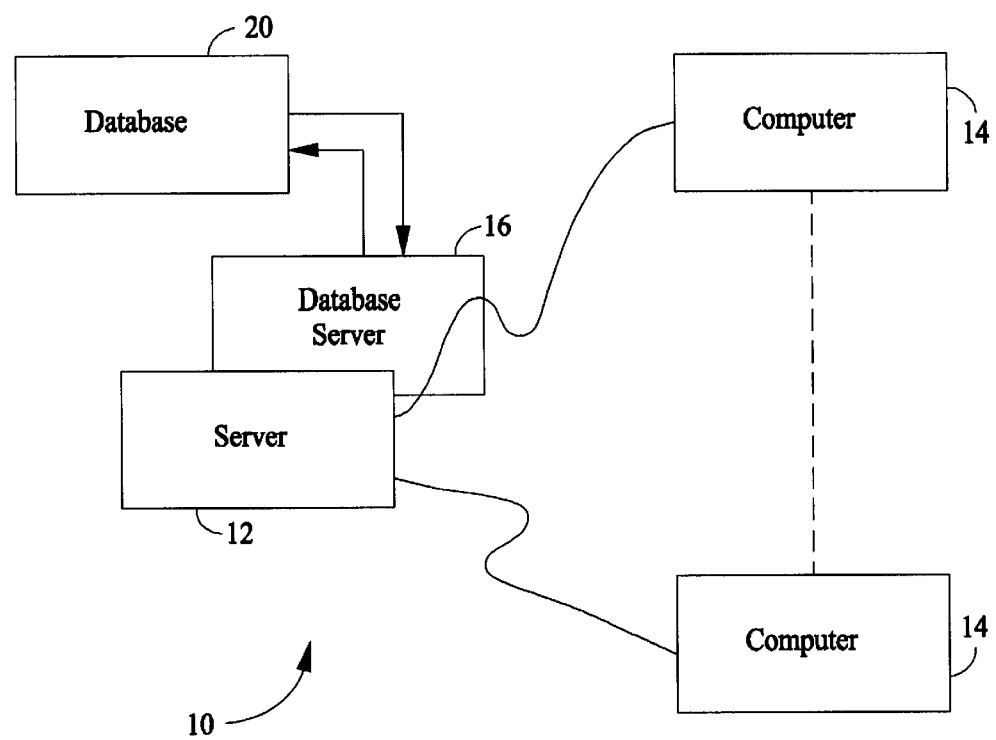
FIG. 1 is a simplified block diagram of a Legal Management System (LMS) in accordance with one embodiment of the present invention.

FIG. 1 is a simplified block diagram of a Legal Management System (LMS) 10 including a server system 12 and a plurality of client systems 14 connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone or other web-based connectable equipment. A database server 16 is connected to a centralized database 20 containing acquisition/deal-related information on a variety of deals, as described below in greater detail. In one embodiment, centralized database 20 is stored on server system 12 and can be accessed by potential users at one of client systems 14 by logging onto server system 12 through one of client systems 14. In an alternative embodiment, centralized database 20 is stored remotely from server system 12.

Figure 2:
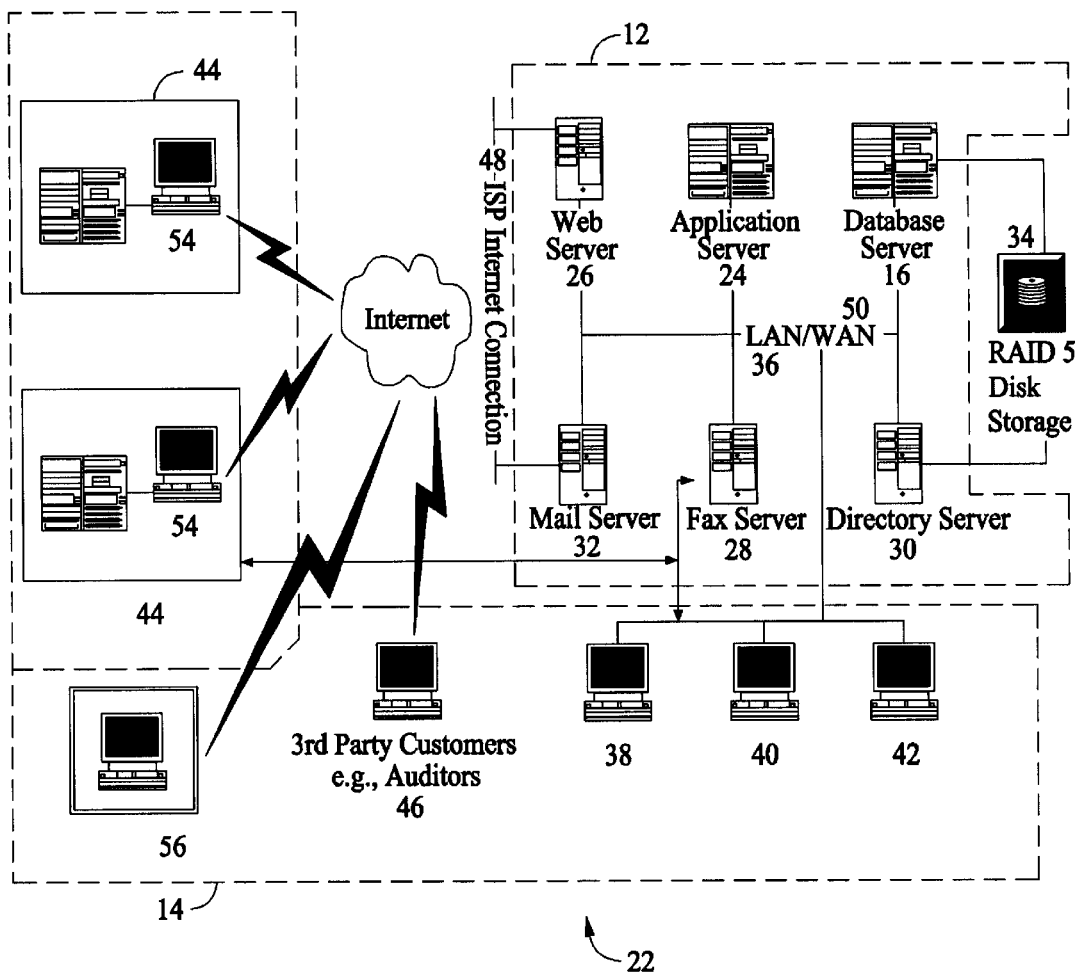
FIG. 2 is an expanded version block diagram of an exemplary embodiment of server architecture of the LMS.

FIG. 2 is an expanded version block diagram of an exemplary embodiment of a server architecture of a Legal Management System (LMS) 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server system 12 is configured to be communicatively coupled to various individuals or employees 44 and to third parties, e.g., internal or external auditors 46 via an ISP Internet connection 48. The communication in the exemplary embodiment is illustrated as being performed via the Internet. However, any other wide area network (WAN) type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual or an employee of the business entity having a workstation 54 can access the Legal Management System (LMS). One of the client systems includes a senior manager's workstation 56 located at a remote location. Workstations 54 and 56 are personal computers having a web browser. Also, workstations 54 and 56 are configured to communicate with server system 12. Furthermore, fax server 28 communicates with employees located outside the business entity's and any of the remotely located client systems, including a client system 56 via a telephone link. Fax server 28 is configured to communicate with other client systems 38, 40, and 42 as well.

Figure 3:
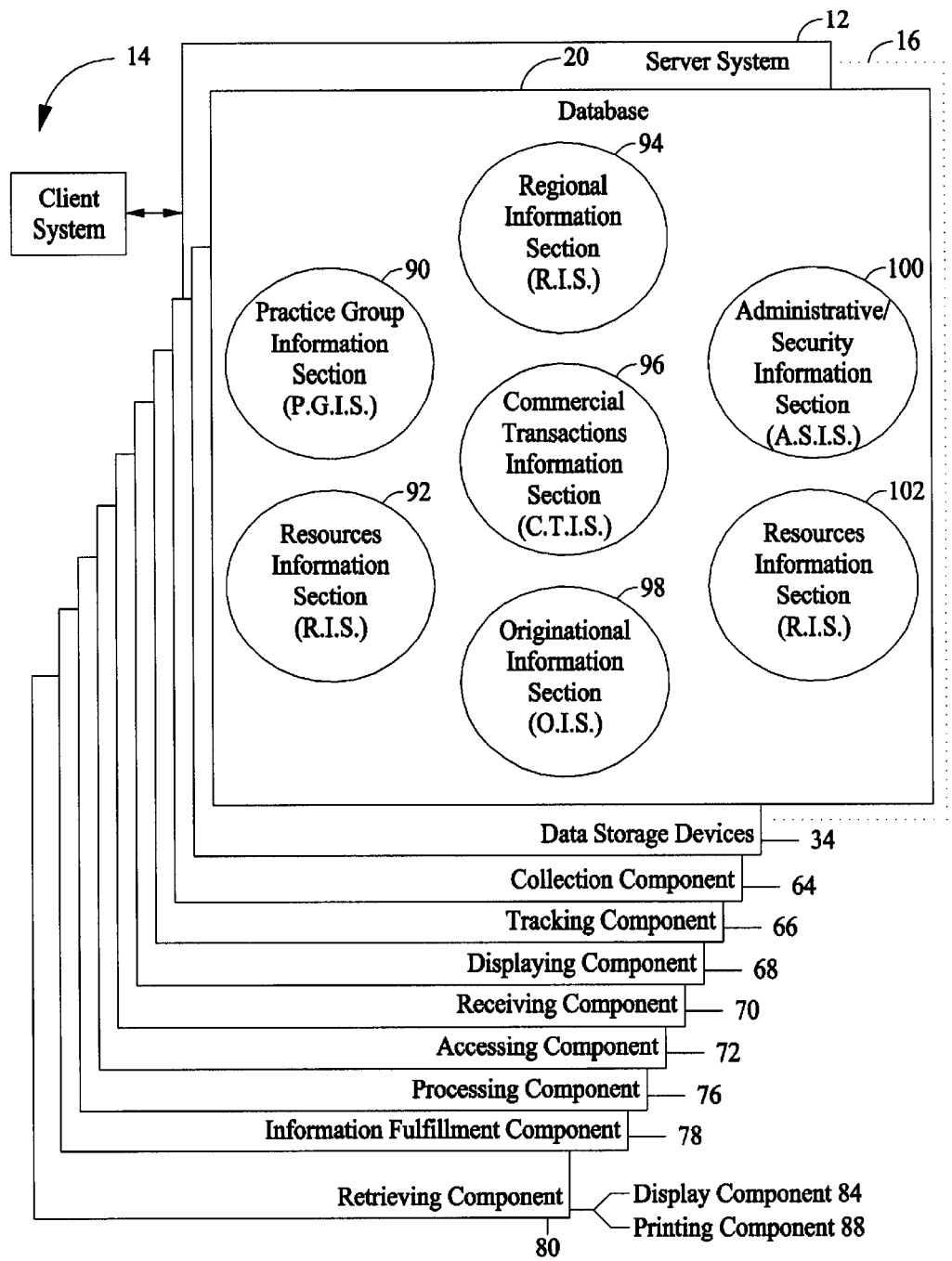
FIG. 3 shows a configuration of a database within the database server of the server system with other related server components.

FIG. 3 shows a configuration of database 20 within database server 16 of server system 12 shown in FIG. 1.

Database 20 is coupled to several separate components within server system 12, which perform specific tasks.

Server system 12 includes a collection component 64 for collecting information from users into centralized database 20, a tracking component 66 for tracking information, a displaying component 68 to display information, a receiving component 70 to receive a specific query from client system 14, and an accessing component 72 to access centralized database 20. Receiving component 70 is programmed for receiving a specific query from one of a plurality of users. Server system 12 further includes a processing component 76 for searching and processing received queries against data storage device 34 containing a variety of information collected by collection component 64. An information fulfillment component 78, located in server system 12, downloads the requested information to the plurality of users in the order in which the requests were 'received by receiving component 70. Information fulfillment component 78 downloads the information after the information is retrieved from data storage device 34 by a retrieving component 80. Retrieving component 80 retrieves, downloads and sends information to client system 14 based on a query received from client system 14 regarding various alternatives.

Retrieving component 80 further includes a display component 84 configured to download information to be displayed on a client system graphical user interface and a printing component 88 configured to print information. Retrieving component 80 generates various reports requested by the user through client system 14 in a predetermined format. In an exemplary embodiment, system 10 includes an administrative component (not shown) that provides an Input Component as well as an Edit Component to facilitate administrative functions. System 10 is flexible to provide other alternative types of reports and is not constrained to the options set forth above.

In an exemplary embodiment, database 20 is divided into a Practice Group Information Section (PGIS) 90, a Preferred Provider Information Section (PPIS) 92, a Regional Information Section (RIS) 94, a Commercial Transaction Information Section (CTIS) 96, an Organizational Information Section (OIS) 98, an Administrative/Security Information Section (ASIS) 100, a Resources Information Section (RIS) 102. These sections within database 20 are interconnected to update and retrieve the information as required, to cater to members of legal counsel responsible for management and implementation of overall legal/business strategy and its execution, and administrative departments responsible for access and security of the LMS.

Figure 4:
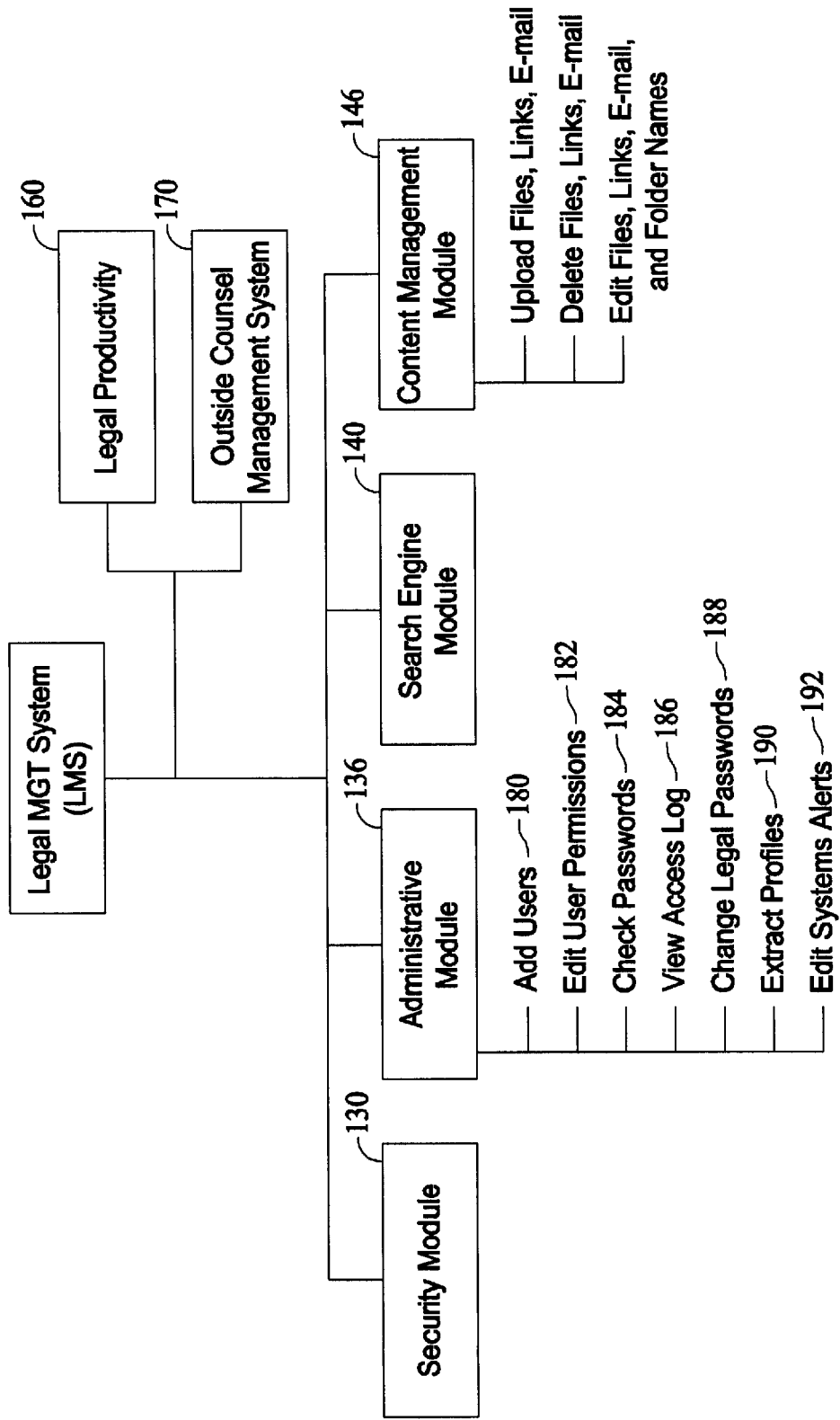
FIG. 4 is an exemplary embodiment of an overview of the LMS.

FIG. 4 is an exemplary embodiment of an overview of the LMS. The LMS is a web portal that serves as an integrated knowledge management system and gateway to all relevant database applications for the legal community. The LMS contains user profiles and is comprised of three additional applications: the intranet, Outside Counsel Management System (OCMS), and Restrictive Covenant Database (RCDB). The intranet is a large, searchable web-based system for collecting, tracking and disseminating information about a business entity's global legal community on a real time basis. All three applications are written in Microsoft Active Server Pages technology. The intranet and OCMS are written with VBScript as the server side language and JavaScript as the client side language. Database interaction for the intranet is handled with the ADO component via an ODBC connection to a SQL Server 6.5 database.

The LMS has several key elements aside from serving as a portal to various legal web applications which includes a Security Module 130, an Administrative Management Module 136, a robust Search Engine Module 140, and a Content Management Module 146.

Security Module 130 provides user access into various applications as necessary. The LMS also provides secure access to Legal Productivity 160 and collaboration tools such as the Outside Counsel Management System (OCMS) 170 and Lotus QuickPlace and Sametime. Access to this site is limited to the corporate legal community.

Security Module 130 is intended to provide a single point of access and user validation to all GE Legal Intranet applications. As such, Security Module 130 stores information in User Table, Profile Table and Status Table. User Table contains the permissions assigned to a user. Any application specific permissions will need to be added to this table. Profile Table contains information about the user (ie: physical location, business unit, phone numbers . . . ). Status Table is a 'lookup' table containing information regarding what the user is with reference to the business entity. The LMS system capabilities include the ability to track successful user logins (by simply writing a log message into the IIS log files when a successful login is completed), invalid logins, and what the user does when accessing the various applications.

Administrative Management Module 136 helps create user Ids and passwords via web forms making direct database connections to the SQL server backend. The administration area for the LMS has several features. This functionality is restricted to intranet Super users and Administrators. When accessing the administration screens, the user must enter a security password for an additional layer of access. The administrator from that point on has the ability to: add users 180, edit user permissions 182, check passwords 184, view an access log 186, change legal password 188, extract profiles 190, and edit system alerts 192.

Adding users 180 requires the administrator to enter a username and password for the new user, and then set the permissions for that user. The user Id and password will initially be set to the same value. This causes code to be triggered to prompt the user for profile information, as well as to change their password on the occasion of their first login. If the username that has been added already exists in the User table of the Security database, then a text message appears on the screen informing the administrator that the new user has not been added. If the new username is unique, then a message appearing indicates that the new user has been added successfully.

In order to edit a user's permissions 182, the administrator enters the first few characters of the username into the search box that will appear after choosing this menu item. After searching, all of the matching user records will appear in a table in a lower frame. The more letters that are provided in the search field, the closer the search will come. To alter the user's permissions, the administrator chooses the appropriate application menu and selects the new permission level. When finished, the administrator selects the "Update" button. If the user's password should be changed back to match the user's username (in the case of a user who has forgotten his password), select the "Reset" checkbox before selecting Update. To delete a user entirely, check the "Delete" checkbox before updating.

Checking password 184 is one of the functions available to the administrator. To see a user's password, the administrator selects the "Check password" link and enters the first few letters of the user's username into the resulting search box. After the search, all matching usernames will appear in a lower frame. Selecting a username will open a small window that will contain the user's password.

Fully customized robust Search Engine Module 140 provides strong search engine capabilities to serve a business entity's legal community needs. The LMS portal's extensive search engine securely spiders the legal intranets of other internal divisions of the business entity, allowing authorized users to search and retrieve over 10,000 documents, including model and sample agreements, research memos, and guidelines from 12 separate libraries. Documents may be retrieved as Microsoft Word, Power Point, PDF, and HTML documents in multiple languages with key search terms highlighted.

Content Management module 146 allows a non-technical user without HTML knowledge to attach, delete, and modify documents in formats such as Microsoft Word, Power point, Excel, PDF and other possible formats. Content Management module 146 permits the user to Upload or Delete Files, Links and E-mails depending on the user's needs. Module 146 further permits the user to Edit Files, Links, E-mails and Folder Names. Content Management Module 146 maximizes the 'self service' capabilities of the system by permitting the business entity's lawyers and/or their administrative support staff to post their own documents and share knowledge in real time across time zones.

Webmaster Content Management module (not shown) allows the authorized users to perform all the functions offered by Content Management module 146 in addition to Uploading Graphics, and Creating, Deleting and Editing Folders.

The architectures of system 10 as well as various components of system 10 are exemplary only. Other architectures are possible and can be utilized in connection with practicing the processes described below.

FIGS. 5 through 17 are exemplary embodiments of screen displays depicting LMS 10 functionality. These various embodiments describe one specific way of practicing the invention, displaying data or printing reports. However, one skilled in the art would recognize that there are multiple possible combinations of organizing the data, displaying the data on the screen as well as printing the data in various reporting formats which still express the same essential matter and process steps.

Figure 5:
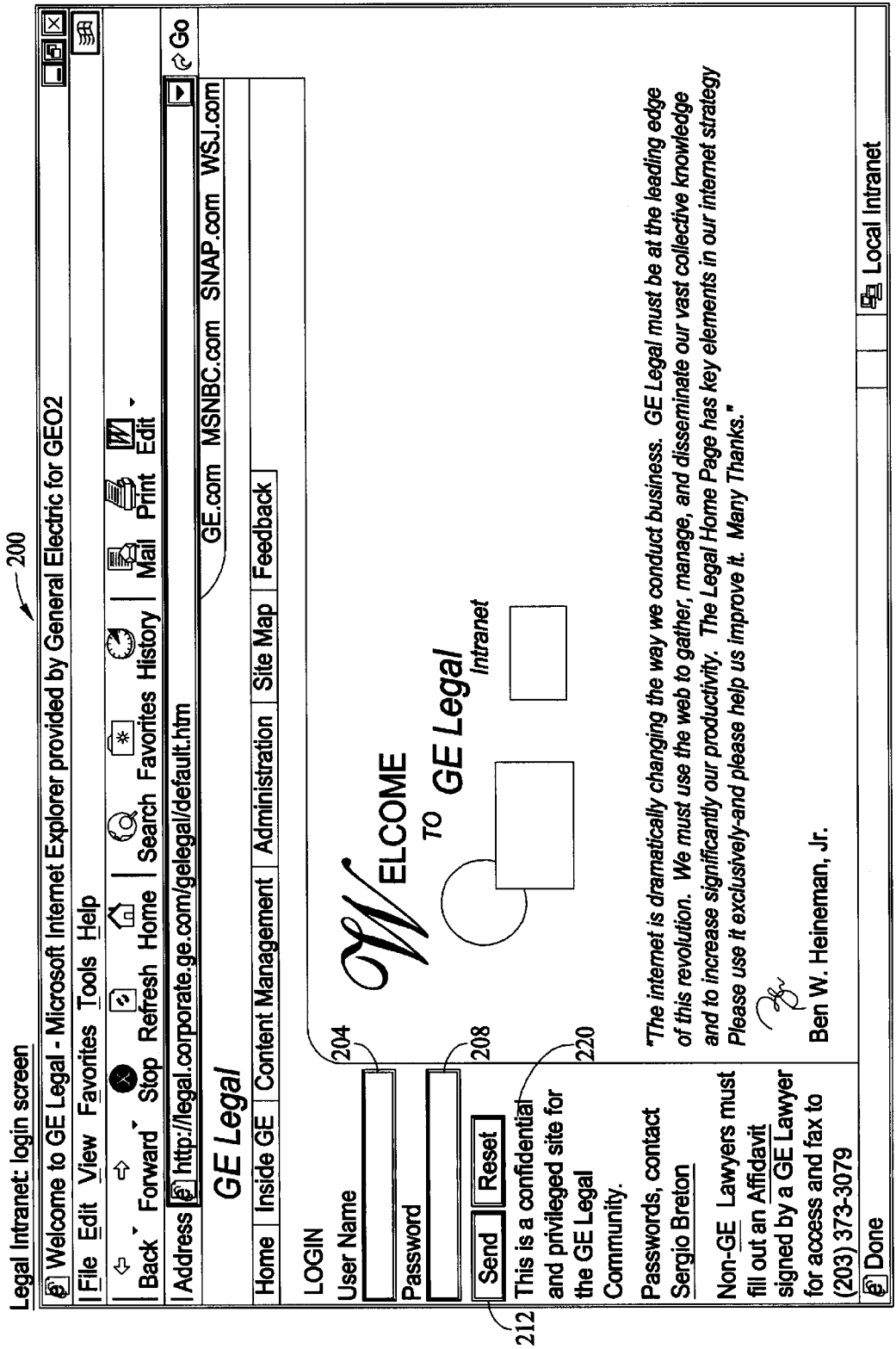
FIG. 5 is an exemplary embodiment of a log-in screen of the LMS shown in FIG. 2.

FIG. 5 is an exemplary embodiment of a log-in screen 200 of LMS 10 shown in FIG. 2. Login screen 200 welcomes the user to the GE Legal Web Site. Through log-in screen 200, the user accesses the database to retrieve the user specific information. When the user enters a User Name 204, Password 208 and transmits the data by selecting the "Send" button 212, system 10 verifies the user's User Name 204 and Password 208. If User Name 204 and Password 208 are valid and matches with the user profile stored in database 20, the web browser displays a main page (shown in FIG. 6 below). If User Name 204 and Password 208 are not valid, the web browser displays a message informing about the unsuccessful login. The user may reset the screen by using "Reset" button 220.

LMS 10 authenticates the user before allowing the access. The LMS is a secured system. There is often a specific security on a document-by-document basis. The site in the present embodiment is only utilized as an intranet but is fully capable to be utilized across various networks on the Internet. The password utilized by the LMS may be case sensitive and may require that it be matched completely before the user is provided access to the system.

Figure 6:
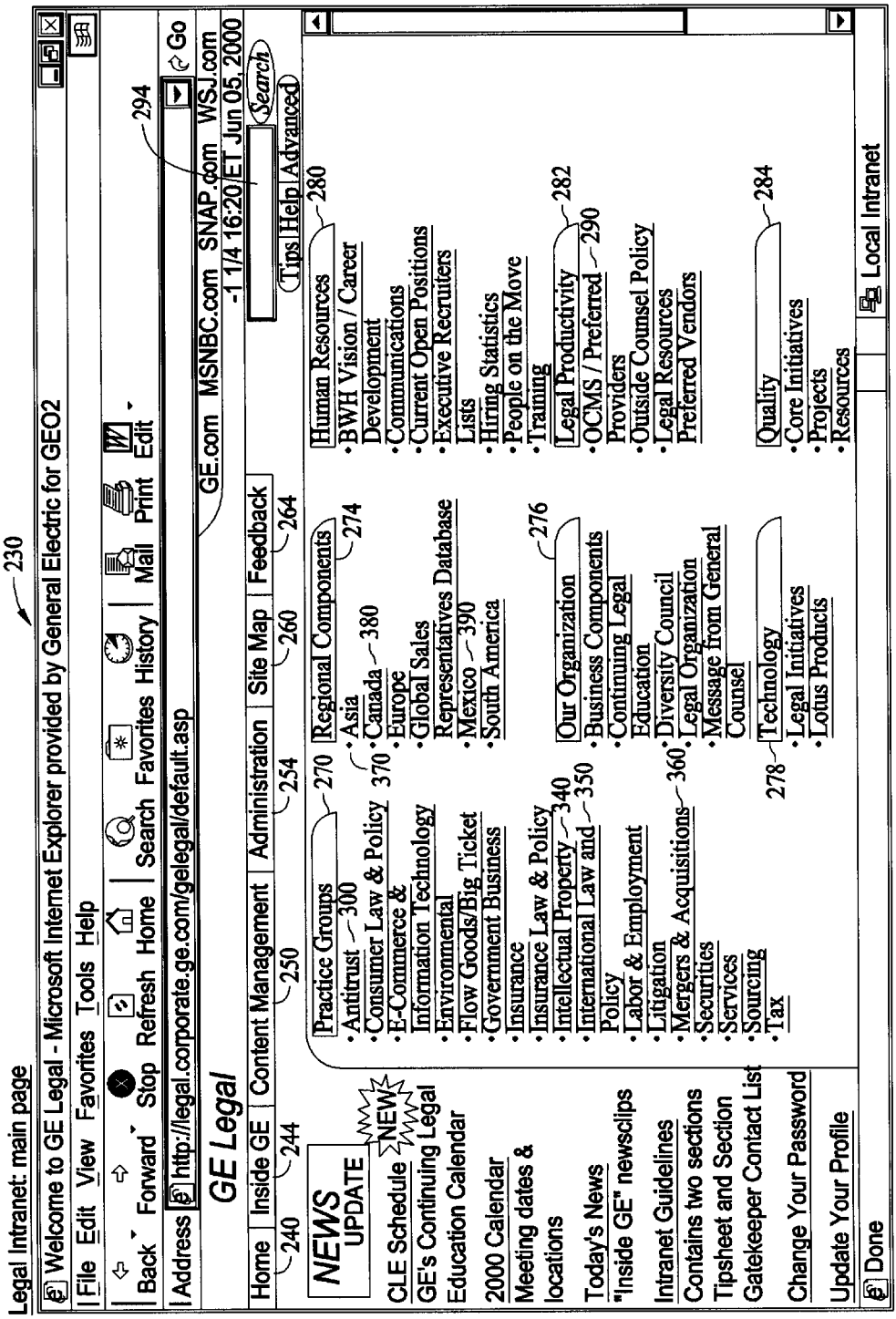
FIG. 6 is an exemplary embodiment of a main page user interface of the LMS.

FIG. 6 is an exemplary embodiment of a main page user interface 230 of LMS 10. User interface 230 is sometimes referred to as a home page of the LMS. FIG. 6 also depicts an exemplary embodiment of a top frame utilized by the system when the user is utilizing the LMS. The top frame utilizes six different navigational buttons to guide the user through the various different parts of the database. For example, navigational buttons displayed are: "Home" 240, "Inside GE" 244, "Content Management" 250, "Administration" 254, "Site Map" 260, and "Feedback" 264. Each navigational button permits the user to get back to the screen from any other screen in the system. Home 240 takes the user back to main page user interface 230.

Once the user logs onto the system, the main page displays several different logical groups. The information is logically organized under these groups, also referred to as the highest level folders. Each group provides an access to the user to different sub-groups or sections organized under the highest level folder through a hypertext link. In an exemplary embodiment, the logical groups displayed include Practice Groups 270, Regional Components 274, Our Organization 276, Technology 278, Human Resources 280, Legal Productivity 282, and Quality 284. Under each of these groups, there are separate sub-groups or sections which the user may access by selecting a specific hypertext link. The user also has an option to access Outside Counsel Management System (OCMS) 290 to search, select or update the data regarding a specific legal services provider. The user may also search any part of database 20 by utilizing search box/function 294 on main page user interface 230. Practice Groups 270 is further organized into several different groups such as Antitrust 300, Intellectual Property 340, International Law and Policy 350, and Mergers and Acquisitions 360. Regional Components 274 data is organized by various different countries such as Asia 370, Canada 380, Mexico 390, and so on. Under each of these groups, there are separate sub-groups or sections which the user may access by selecting a specific hypertext link.

Figure 7:
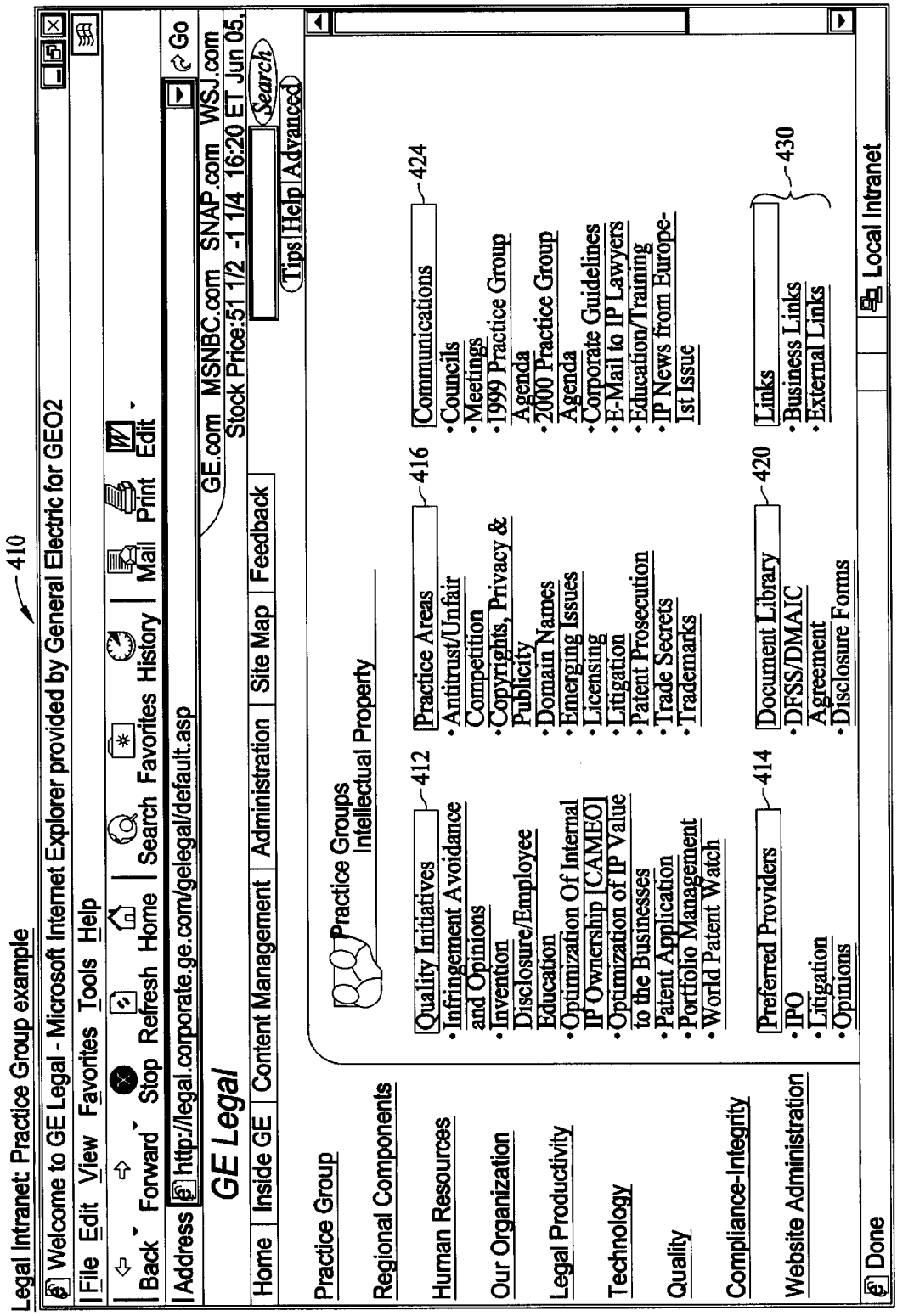
FIG. 7 is an exemplary embodiment of an Intellectual Property Practice Group user interface displayed by the LMS when a user selects Intellectual Property hypertext link from main page user interface.

FIG. 7 is an exemplary embodiment of an Intellectual Property Practice Group user interface 410 displayed by system 10 (shown in FIG. 1) when a user selects Intellectual Property 340 hypertext link from main page user interface 230 (shown in FIG. 6). Intellectual Property Practice Group user interface 410 displays several sub-folders including Quality Initiatives 412, Preferred Providers 414, Practice Areas 416, Document Library 420, Communications 424, and other hypertext links 430. The sub-folders from practice group to practice group may vary depending on the area of specialty. Under each of these sub-folders, there are separate sections which the user may access by selecting a specific hypertext link.

Figure 8:
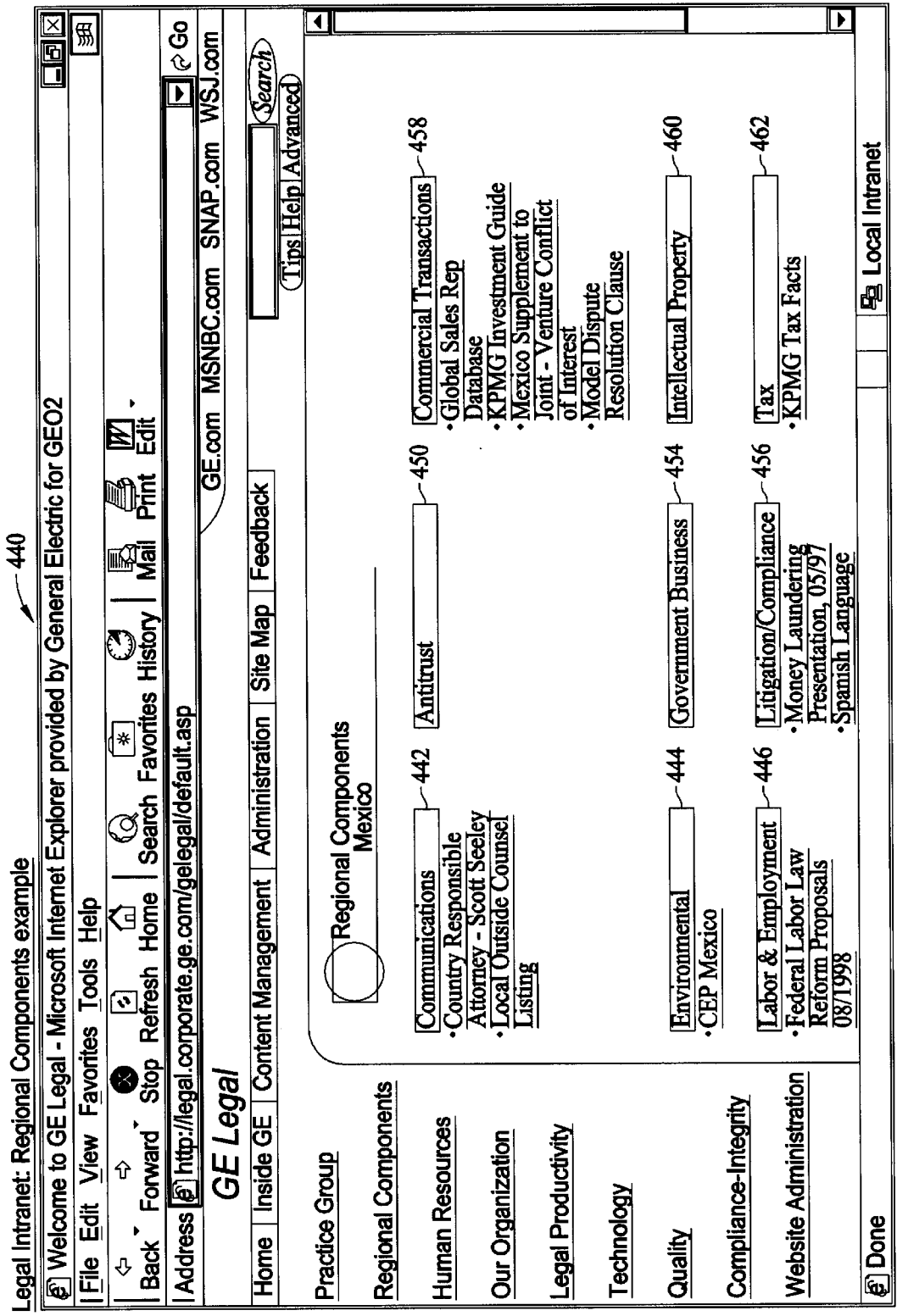
FIG. 8 is an exemplary embodiment of a Mexico Regional Component user interface displayed by the LMS when a user selects Mexico hypertext link from main page user interface.

FIG. 8 is an exemplary embodiment of a Mexico Regional Component user interface 440 displayed by system 10 (shown in FIG. 1) when a user selects Mexico 390 hypertext link from main page user interface 230 (shown in FIG. 6). Mexico Regional Component user interface 440 displays several subfolders specific to Mexico operations of the business entity including Communications 442, Environmental 444, Labor and Employment 446, Antitrust 450, Governmental Business 454, Litigation Compliance 456, Commercial Transactions 458, Intellectual Property 460 and Tax 462. The sub-folders from region to region may vary depending on the specific issues relating to that region. Under each of these sub-folders, there are separate sections which the user may access by selecting a specific hypertext link.

FIGS. 9 through 13 depict the process relating to Content Management Module.

Figure 9:
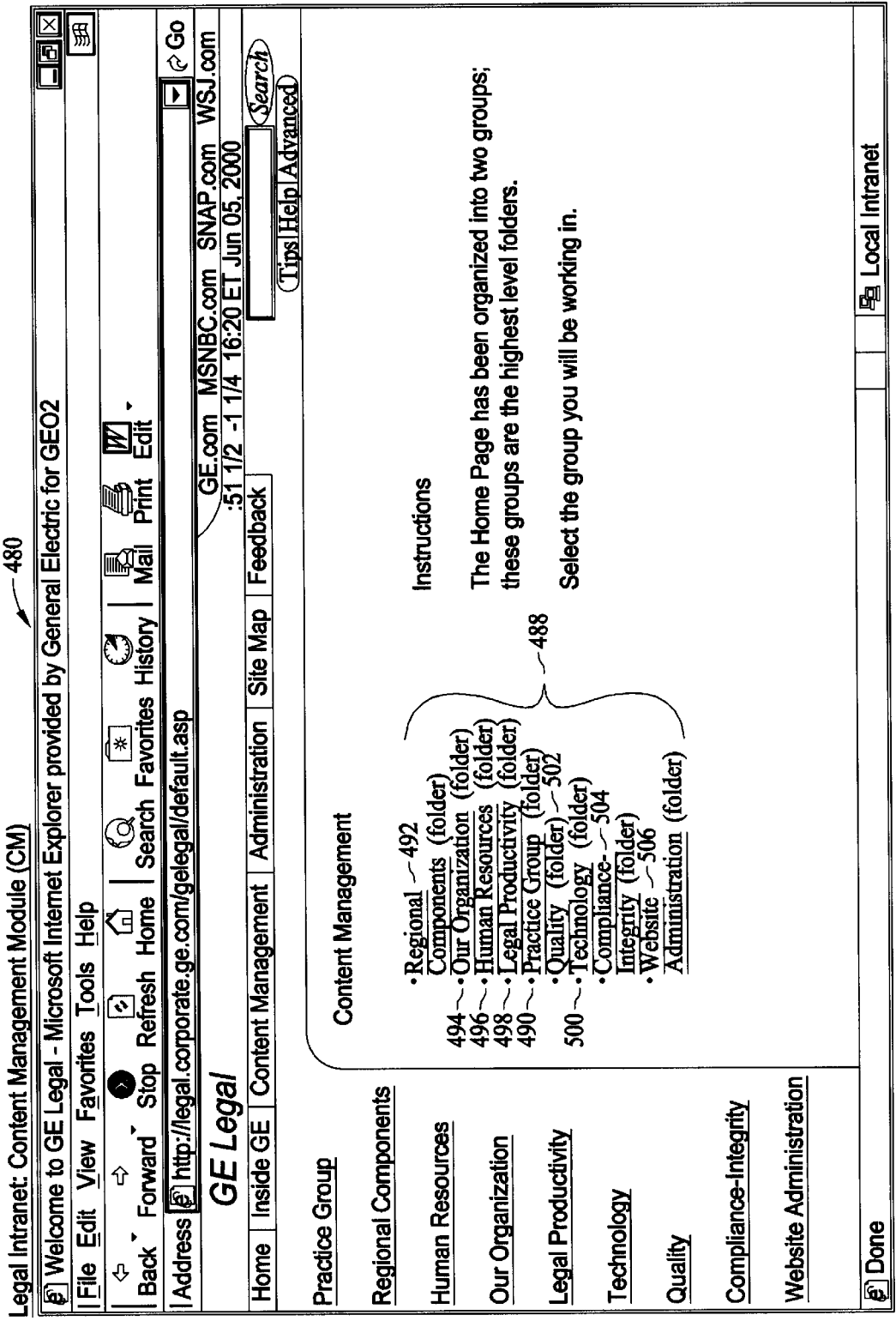
FIG. 9 is an exemplary embodiment of a Content Management user interface displayed by the LMS when a user selects Content Management navigational button from main page user interface.

FIG. 9 is an exemplary embodiment of a Content Management user interface 480 displayed by system 10 (shown in FIG. 1) when a user selects Content Management 250 navigational button from main page user interface 230 (shown in FIG. 6). The content management module of the main page has been designed much similar to what the user experiences in Windows Explorer—it uses the folder and file structure. Folders are containers for organizing files of various types such as Microsoft Word, Excel, Power point, PDF, HTML etc. Through content management, the user can create folders, folders inside folders to organize business/legal files. Inside a folder, more folders, or files can be stored. Content Management user interface 480, also known as a home page of content management, has been organized into logical groups 488. Logical groups 488 are the highest level folders. Logical groups 488, as shown in an exemplary embodiment are: Practice Groups 490, Regional Components 492, Our Organization 494, Human Resources 496, Legal Productivity 498, Technology 500, Quality 502, Compliance-Integrity 504, and Web site Administration 506. Once the user selects a specific logical group out (for example Practice Group 490) of available logical groups 488, system 10 downloads and displays all group folders organized into database 20 relating to that specific logical group.

Figure 10:
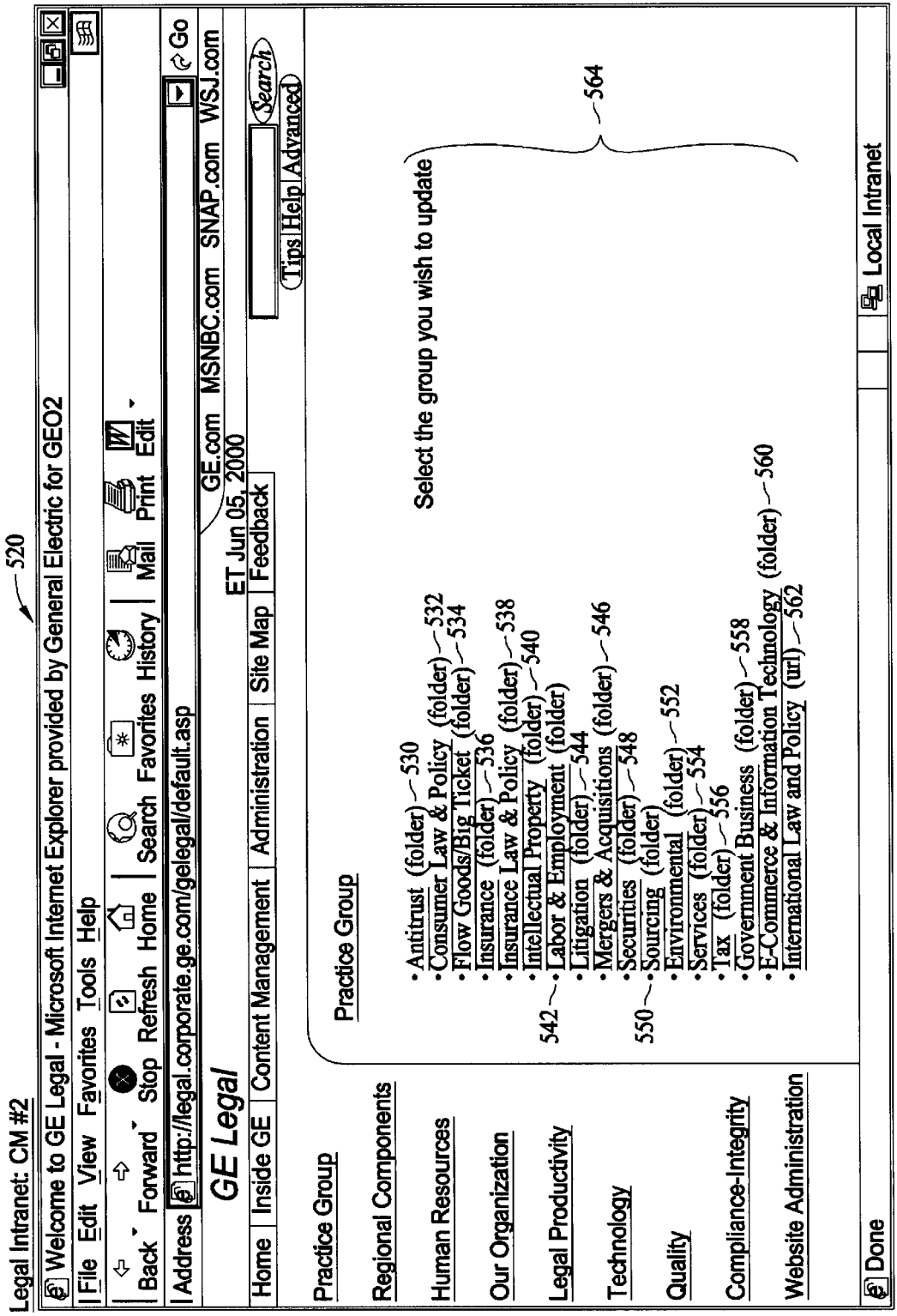
FIG. 10 is an exemplary embodiment of a Practice Group user interface displayed by the LMS when a user selects Practice Group hypertext link from Content Management user interface.

FIG. 10 is an exemplary embodiment of a Practice Group user interface 520 displayed by system 10 (shown in FIG. 1) when a user selects Practice Group 490 hypertext link from Content Management user interface 480 (shown in FIG. 9). In an exemplary embodiment of the invention, Practice Group 490 is divided into several practice group folders including an Antitrust folder 530, a Consumer Law folder 532, a Flow Goods folder 534, an Insurance folder 536, an Insurance Law and Policy folder 538, an Intellectual Property folder 540, a Labor and Employment folder 542, a Litigation folder 544, a Mergers and Acquisitions folder 546, a Securities folder 548, a Sourcing folder 550, an Environmental folder 552, a Services folder 554, a Tax folder 556, a Government Business folder 558, an E-Commerce & Information Technology folder 560, and an International Law and Policy hypertext link 562. Once the user selects a specific folder (for example Intellectual Property folder 540) out of all available folders 564, system 10 downloads and displays all sub-folders organized into database 20 relating to that specific folder.

Figure 11:
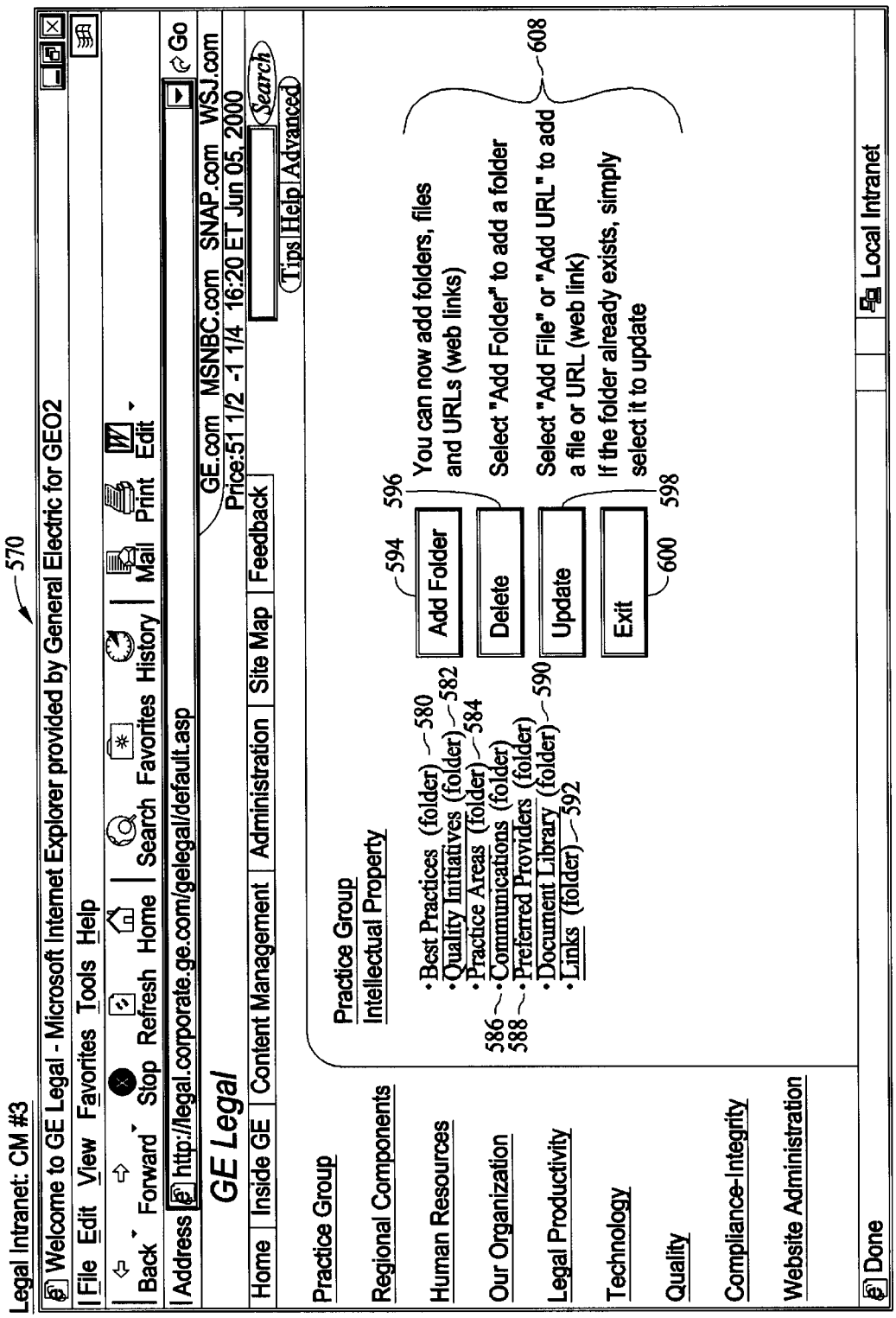
FIG. 11 is an exemplary embodiment of an Intellectual Property folder user interface displayed by the LMS when a user selects Intellectual Property folder hypertext link from Content Management User Interface.

FIG. 11 is an exemplary embodiment of an Intellectual Property folder user interface 570 displayed by system 10 (shown in FIG. 1) when a user selects Intellectual Property folder 540 hypertext link (shown in FIG. 10). In an exemplary embodiment of the invention, sub-folders of Intellectual Property folder 540 include Best Practices folder 580, Quality Initiatives folder 582, Practice Areas folder 584, Communications folder 586, Preferred Providers folder 588, Document Library folder 590, and Links folder 592. The user may Add Folder 594, Delete 596 a folder, Update 598 a folder or simply Exit 600 from Intellectual Property folder user interface 570. The user may also add a file or add an URL. If the folder already exists, the user simply selects it to update or delete a file from the folder. Once the user selects a specific sub-folder (for example Quality Initiatives folder 582) out of all available folders 608, system 10 downloads and displays all sub-folders organized into database 20 relating to that specific sub-folder. The users cannot delete an entire folder. Only the webmaster can delete the folder (so a user would call the webmaster to perform this task). This feature is again for additional precaution.

Figure 12:
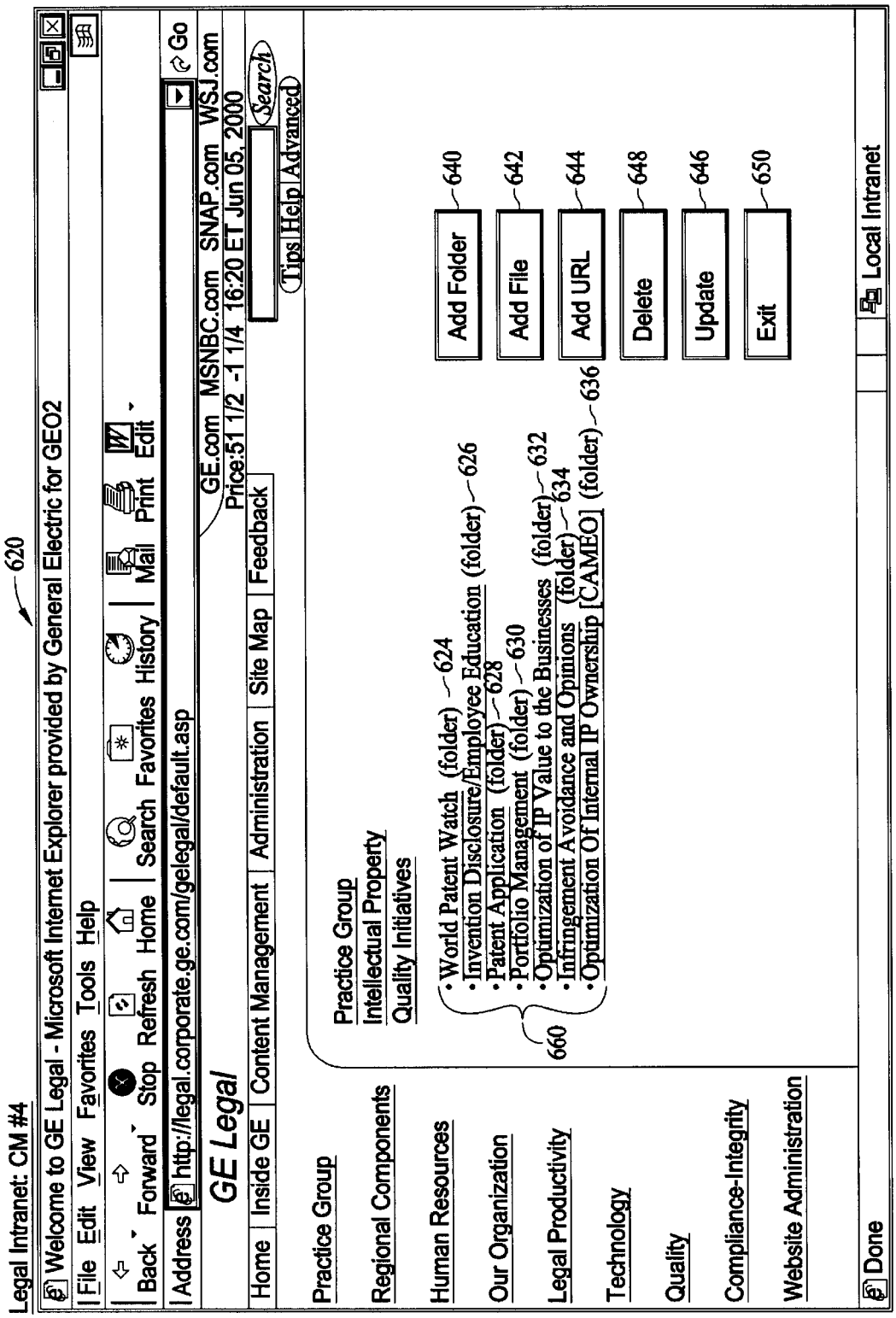
FIG. 12 is an exemplary embodiment of a Quality Initiative folder user interface displayed by the LMS when a user selects Quality Initiative folder hypertext link.

FIG. 12 is an exemplary embodiment of a Quality Initiative folder user interface 620 displayed by system 10 (shown in FIG. 1) when a user selects Quality Initiative folder 582 hypertext link (shown in FIG. 11). In an exemplary embodiment of the invention, sub-folders of Quality Initiative folder 582 include a World Patent Watch folder 624, an Invention Disclosure/Employee Education folder 626, a Patent Application folder 628, a Portfolio Management folder 630, an Optimization of IP Value to the Businesses folder 632, an Infringement Avoidance and Opinions folder 634, and an Optimization of Internal IP Ownership folder 636. The user can now add folders, files and URL's. The user also has an option to add a folder through an add folder hypertext link 640 to organize user's data if the user wishes, or if the folder already exists, simply select it to perform the necessary functions. The user may add a file or URL at this level if the user so chooses by selecting "Add File" 642 or "Add URL" 644. If the folder already exists, the user simply selects it to update 646 or delete 648 a file from the folder or exit 650 from Quality Initiative folder user interface 620. Once the user selects a specific sub-folder (for example Patent Application folder 628) out of all available folders 660, system 10 downloads and displays all sub-folders organized into database 20 relating to that specific sub-folder.

Figure 13:
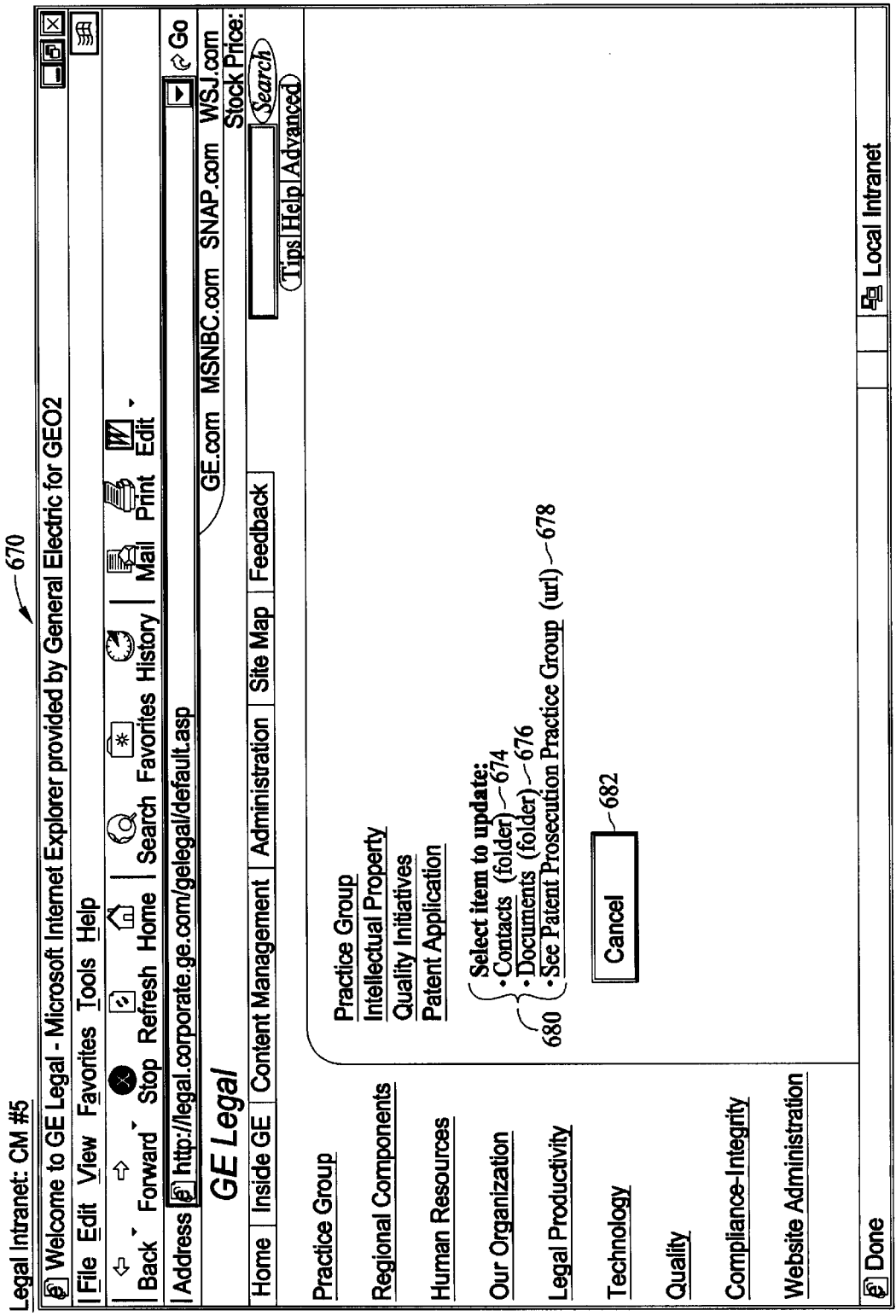
FIG. 13 is an exemplary embodiment of a Patent Application folder user interface displayed by the LMS when a user selects Patent Application folder hypertext link from Content Management User Interface.

FIG. 13 is an exemplary embodiment of a Patent Application folder user interface 670 displayed by system 10 (shown in FIG. 1) when a user selects Patent Application folder 628 hypertext link (shown in FIG. 12). In an exemplary embodiment of the invention, sub-folders of Patent Application folder 628 include a Contacts folder 674, a Documents folder 676, and an URL 678 for Patent Prosecution Practice Group. The user selects one of an item out of all items 680 displayed on user interface 670. The user may cancel or stop the process of adding, updating or deleting by selecting a Cancel 682 button.

To add a document, the user selects Add File 642 (shown in FIG. 12), types in a title, selects Browse (not shown), selects a document from the user's hard drive, and selects the Submit button (not shown). To add a link, the user selects Add URL 644 (shown in FIG. 12), types in a title, types in (or cut/paste) the URL (http:www . . . ) for a link. For an e-mail address, the user does not use "http" but types in "mailto" and an address (i.e., mailto: JohnDoe@aol.com). The user should not add documents/links without placing them in or creating a folder first.

Figure 14:
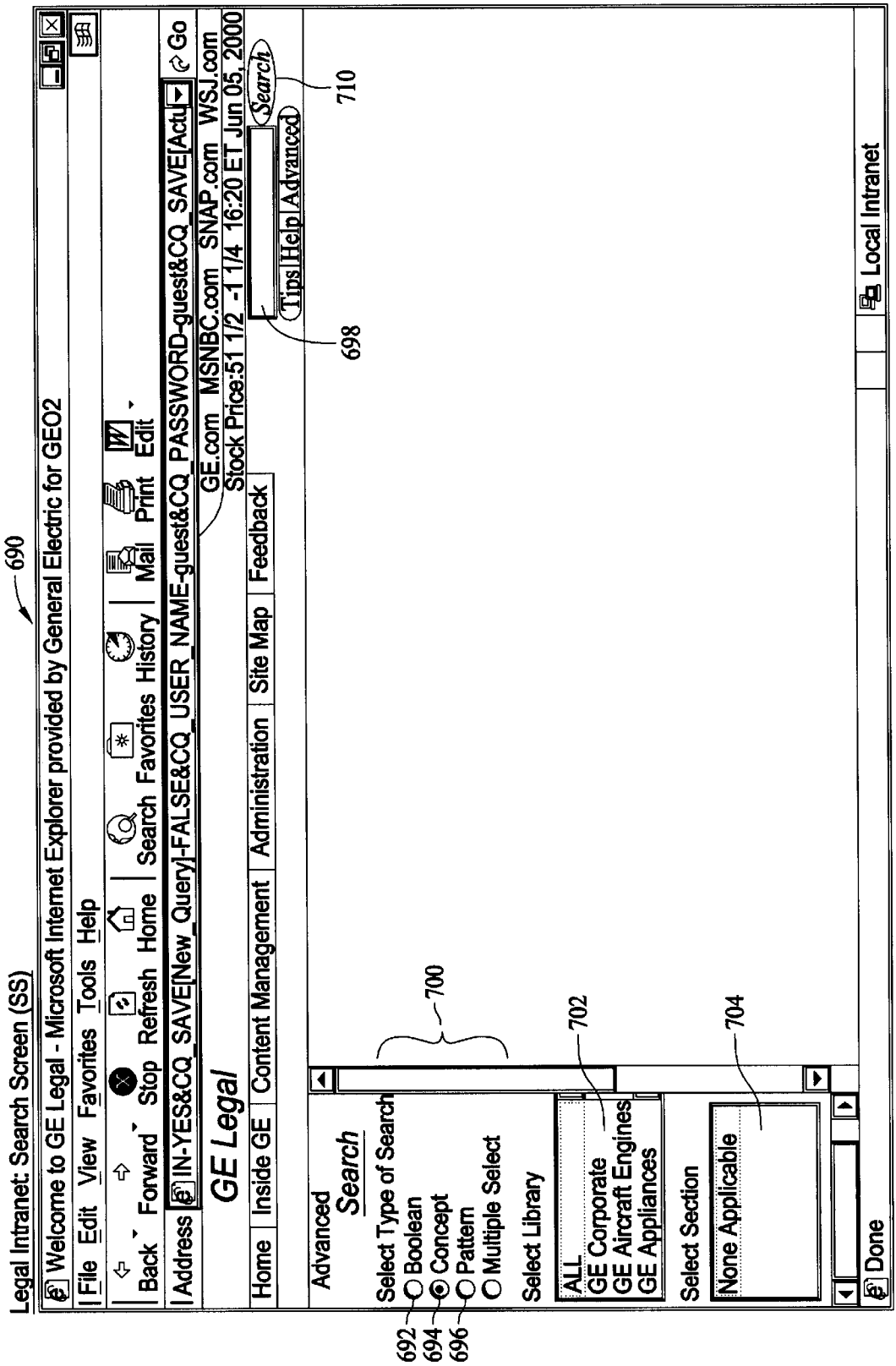
FIG. 14 is an exemplary embodiment of a first Search Screen user interface displayed by the LMS when a user selects search option.

FIG. 14 is an exemplary embodiment of a first Search Screen user interface 690 displayed by system 10 (shown in FIG. 1) when a user selects the search option. Through this user interface, the user may conduct various types of searches based on Boolean type 692, Concept type 694 or Pattern type 696. The user can type a word or a phrase in a box 698, select a type of search 700, select a library 702, select a section of the library 704, and select a search button 710. The results of the search are displayed on the user interface with hypertext links to direct the user to the specific request.

Figure 15:
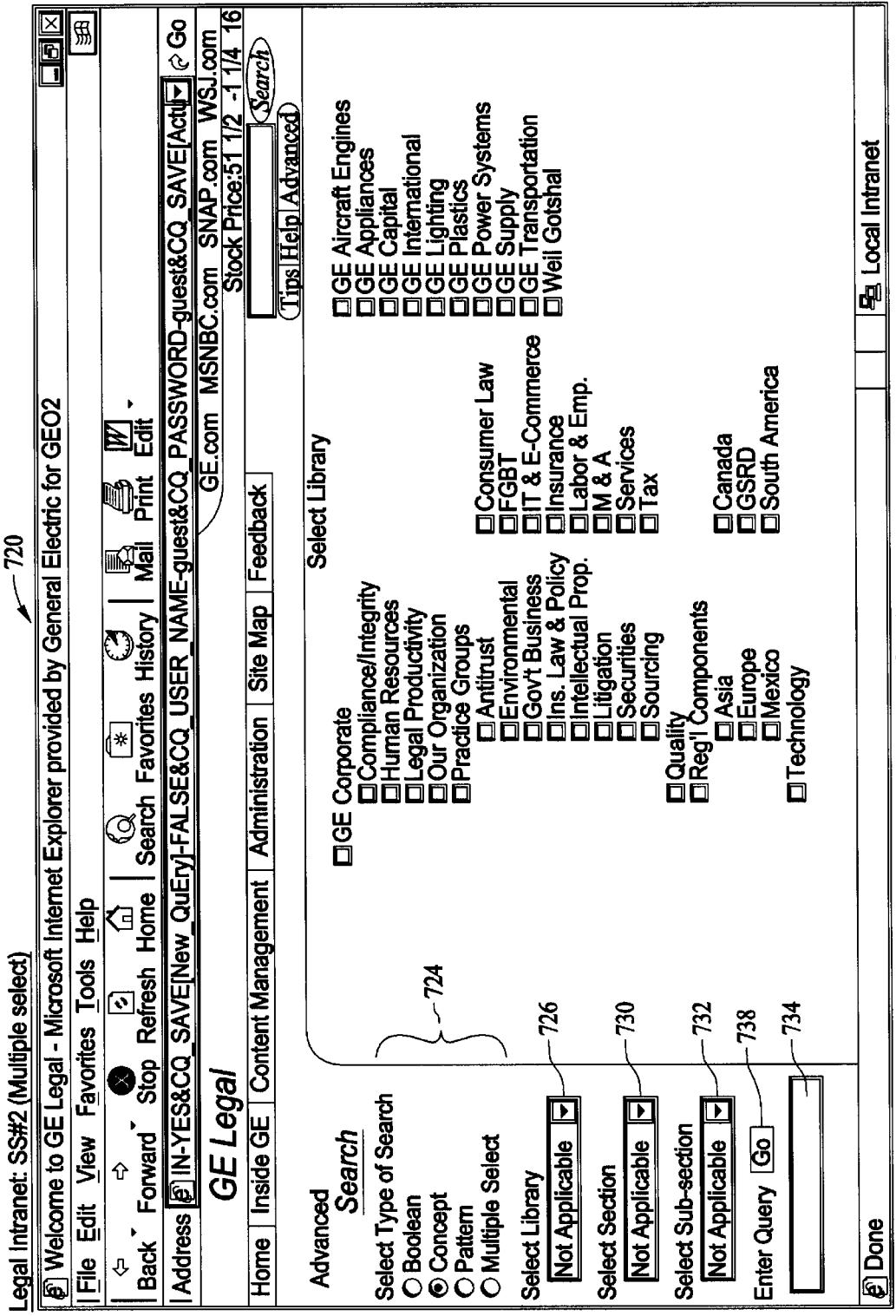
FIG. 15 is an exemplary embodiment of a second Search Screen user interface displayed by the LMS when a user wishes to utilize search option within a specific library.

FIG. 15 is an exemplary embodiment of a second Search Screen user interface 720 displayed by system 10 (shown in FIG. 1) when a user wishes to utilize the search option within a specific library. From this user interface, the user may conduct various types of searches after selecting a type of search 724, selecting a library 726, select a section within the library 730, select a sub-section within the section 732, entering a key word or set of key words within a box provided 734 and selecting a go button 738 to conduct the search. Sub-groups exist only by practice areas for streamlining search criteria. The results of the search are displayed on the user interface with hypertext links to direct the user to the specific request.

Figure 16:
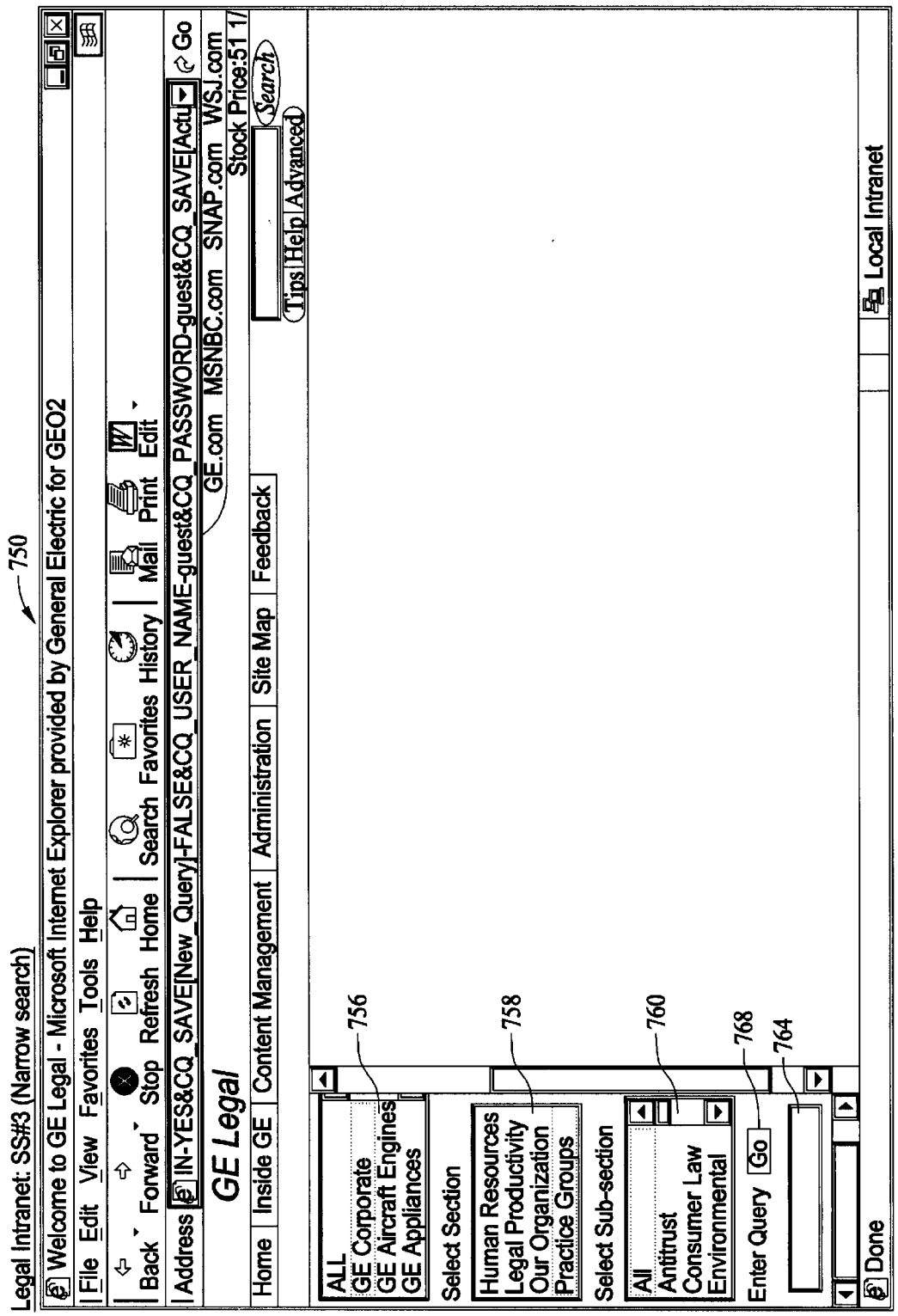
FIG. 16 is an alternate exemplary embodiment of a third Search Screen user interface displayed by the LMS when a user wishes to utilize the search option.

FIG. 16 is an alternate exemplary embodiment of a third Search Screen user interface 750 displayed by system 10 (shown in FIG. 1) when a user wishes to utilize the search option. From this user interface, the user may conduct various types of searches after selecting a library 756, a section within the library 758, a sub-section within the section 760, entering a key word or set of key words within a box provided 764 and selecting a go button 768 to conduct the search. The results of the search are displayed on the user interface with hypertext links to direct the user to the specific request.

FIG. 17 is an exemplary embodiment of a Webmaster Module user interface 770 displayed by system 10 (shown in FIG. 1). Through Webmaster Module user interface 770, the user may select Add Folder 774, Delete 776 or Update 778 an existing folder, or Exit 780 from the user interface.

Figure 18:
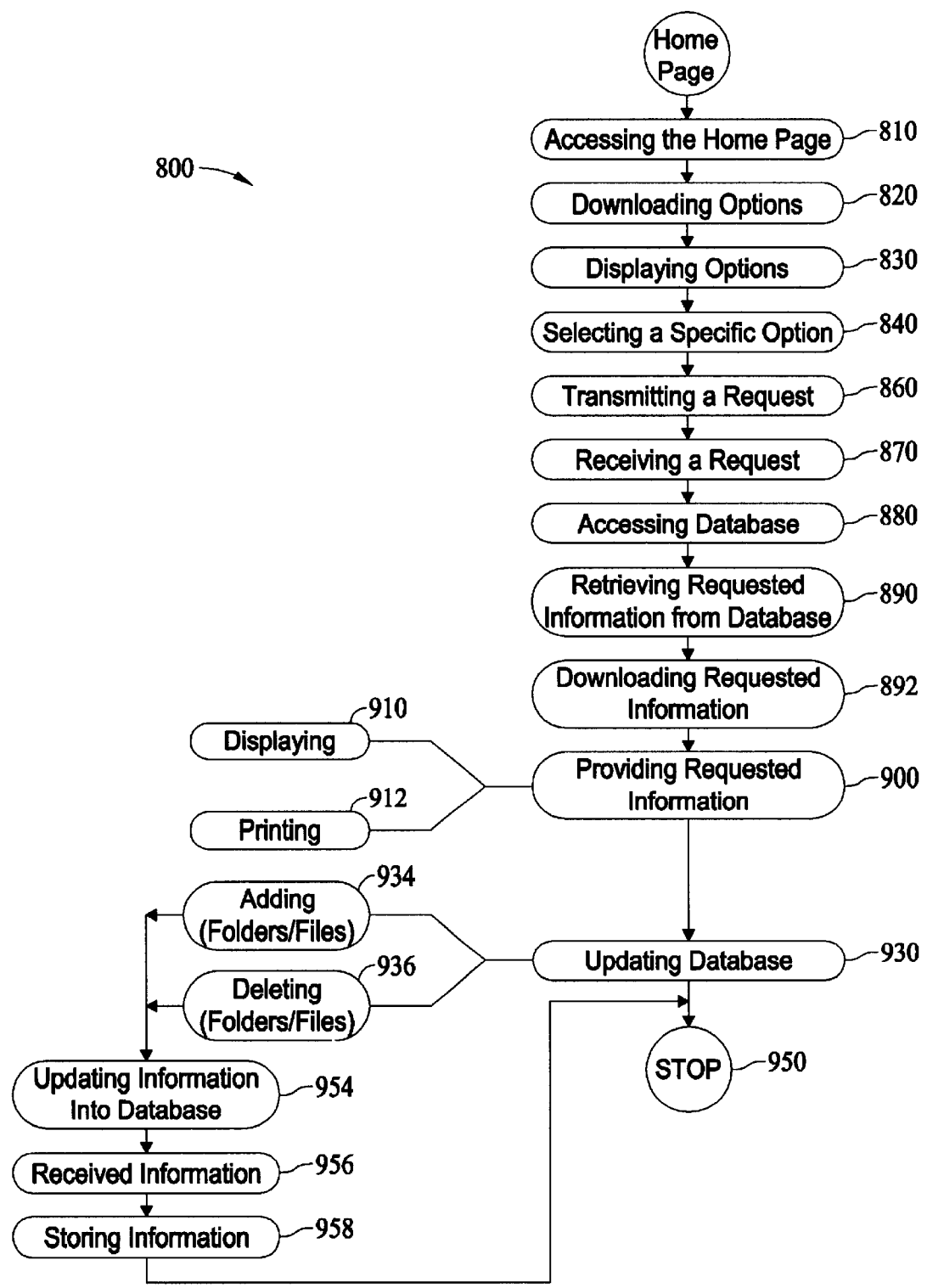
FIG. 18 is a flow chart depicting process steps utilized by the LMS.

FIG. 18 is an algorithm 800 of LMS 10. Under the web-based system 10 (shown in FIG. 1), the user accesses 810 home page of the web site through client system 14 (shown in FIG. 1). Server system 12 (shown in FIG. 1) downloads 820 and displays 830 several options. Once the user selects 840 a specific option out of various hypertext links, the request is sent to server system 12. Transmitting a request 860 is accomplished either by click of a mouse or by a voice command. Once server system 12 receives 870 a request, server system 12 accesses 880 database server 16 (shown in FIG. 1) and retrieves 890 pertinent information from database 20 (shown in FIG. 1). The requested information is downloaded 892 and provided 900 to client system 14 (shown in FIG. 1) from server 12. Server system 12 provides 900 the requested information to the user by either displaying 910 the information on the user's display or by printing 912 it on an attached or a remote printer. The user continues to search database 20 for other information, updates 930 the database by adding 934 folders, files or users, deleting 936 folders, files or users to database 20 with new or revised information or exits 950 from system 10. The updated information 954 is received 956 by server system 12 for storing 958 in database 20. The user also updates 930 the database by adding, deleting or modifying the information regarding a particular group, region, or business. In another embodiment, client system 14, as well as server system 12, are protected from access by unauthorized individuals. As described, LMS 10 is an interactive searchable database 20 for all business/legal information and provides flexibility to users as well executives to stay current with the information to-date. The system provides the ability for attorneys, managers, employees and database administrators to directly update, review and generate reports of current information.

While the invention has been described in terms of various specific embodiments, those skilled in the art will recognize that the invention can be practiced with modification within the spirit and scope of the claims.

What is claimed is:

1. A network based Legal Management System for managing, storing, disseminating and sharing legal information relating to a business entity on-line in real time, said system comprising:
    a client system comprising a browser;
    a centralized database for storing legal information comprising information relating to the business entity and comprising at least business information, organizational information, human resources information, legal productivity information, technology related information, and quality information;
    a server system configured to be coupled to said client system and said database, said server system further configured to:
        receive legal information from the client system;
        process and organize the legal information into groups including Practice Groups, Regional Components, Our Organization, Technology, Human Resources, Legal Productivity, and Quality;
        store the legal information into the centralized database by group;
        update the centralized database periodically to maintain the legal information; and
        provide the updated legal information in response to an inquiry.

2. A system according to claim 1 wherein said client system is further configured with:
    a displaying component for displaying a variety of options to a user; and
    a sending component to send an inquiry to the server system so that the server system can process and download the requested legal information to the client system.

3. A system according to claim 2 wherein the sending component functions in response to a click of a mouse button.

4. A system according to claim 2 wherein the sending component functions in response to a voice command.

5. The client system of claim 1 wherein said system is further configured to be protected from access by unauthorized individuals.

6. A system according to claim 1 wherein said server system is further configured with:
    a collection component for collecting the (deal) legal information from users into the centralized database;
    a tracking component for tracking the legal information on an on-going basis;
    a displaying component for displaying the legal information;
    a receiving component for receiving an inquiry from the client system regarding at least one of business information, (legal information), organizational information, human resources information, legal productivity information, technology related information, quality initiatives information, and information relating to various business divisions located in various regions; and
    an accessing component for accessing the centralized database and causing the retrieved legal information to be displayed on the client system.

7. A system according to claim 6 wherein said server system further configured with a receiving component for receiving an inquiry to provide legal information from one of a plurality of users.

8. A system according to claim 6 wherein said server system further configured with a processing component for searching and processing received inquiries against the database containing a variety of legal information collected by the collection component.

9. A system according to claim 6 wherein said server system further configured with a retrieving component to retrieve the legal information from the database.

10. A system according to claim 6 wherein said server system further configured with an information fulfillment component that downloads the requested legal information after retrieving from the data storage device to the plurality of users in the order in which the requests were received by the receiving component.

11. A system according to claim 1 wherein said server system is further configured to receive legal information including (at least one of) business information, (legal information), organizational information, human resources information, legal productivity information, technology related information, quality initiatives information, and information relating to various business divisions located in various regions.

12. A system according to claim 11 wherein said server system is further configured to receive legal information on-line directly through the client system.

13. A system according to claim 11 wherein said server system is further configured to receive legal information in a pre-determined format established for inputting information.

14. A system according to claim 11 wherein said server system is further configured to submit legal information through a pull down menu.

15. A system according to claim 11 wherein said server system is further configured to submit legal information by selecting at least one option out of a plurality of fields.

16. A system according to claim 1 wherein said server system is further configured to organize legal information into different sections of the database for easy retrieval of the information.

17. A system according to claim 1 wherein said server system is further configured to create various folders and file within each groups and folders to organize legal information.

18. A system according to claim 1 wherein said server system is further configured to create logical groups consisting of at least one of an Antitrust Group, a Consumer Law and Policy Group, an E-Commerce and Information Technology Group, an Environmental Group, a Flow Goods/Big Ticket Group, an Insurance Group, an Insurance Law and Policy Group, an Intellectual Property Group, an International Law and Policy Group, a Labor and Employment Group, a Litigation Group, a Mergers and Acquisition Group, a Securities Group, a Services Group, a Sourcing Group, and a Tax Group.

19. A system according to claim 1 wherein said server system is further configured to create folders, sub-folders, sub sub-folders, and files as necessary to organize the legal information.

20. A system according to claim 1 wherein said server system is further configured to organize legal information through a Content Management Module which allows a non-technical user without HTML knowledge to attach, delete, and modify documents in formats such as Microsoft Word, Word Perfect, Power point, Excel, and Portable Document Format.

21. A system according to claim 1 wherein said server system is further configured to store legal information against unique identifiers.

22. A system according to claim 1 wherein said server system is further configured to store legal information in a pre-determined format.

23. A system according to claim 1 wherein said server system configured to store legal information further configured to:
    track legal information on a real time basis; and
    store legal information on a real time basis by updating stored legal information by adding the new legal information to the centralized database on a real time basis to provide up-to date legal information instantaneously to the user upon a request.

24. A system according to claim 1 wherein said server system is configured to update the centralized database is further configured to:
    add and delete the legal information; and
    edit the legal information.

25. A system according to claim 1 wherein said server system is further configured to enter legal information on-line.

26. A system according to claim 25 wherein said server system is further configured to enter legal information at least through one of a voice activation command and a device connected to the client system.

27. A system according to claim 1 wherein said server system is configured to provide the information in response to an inquiry is further configured to:
    download requested legal information from a server system; and
    display the requested legal information on a client system in response to the inquiry.

28. A system according to claim 1 wherein said server system is configured to provide the legal information in response to an inquiry is further configured to print requested information in a pre-determined format.

29. A system according to claim 1 wherein said client system and said server system are connected via a network and wherein the network is one of a wide area network, a local area network, an intranet and the Internet.

* * * * *

UNITED STATES PATENT AND TRADEMARK OFFICE
CERTIFICATE OF CORRECTION

PATENT NO. : 6,839,707 B2
DATED : January 4, 2005
INVENTOR(S) : Lee et al.

It is certified that error appears in the above-identified patent and that said Letters Patent is hereby corrected as shown below:

Title page,
Item [75], Inventor, delete "Darien, CT" and insert therefor -- Westport, CT --.

Column 12,
Line 25, delete "1" and insert therefor -- 2 --.
Line 30, delete "(deal)".
Line 38, delete "(legal information),".

Column 13,
Line 1, delete "(at least one of)".
Lines 1-2, delete "(legal information),".

Signed and Sealed this

Twenty-second Day of March, 2005

JON W. DUDAS
*Director of the United States Patent and Trademark Office*